(12) United States Patent
Cucinotta

(10) Patent No.: US 7,391,471 B1
(45) Date of Patent: Jun. 24, 2008

(54) APPARATUS AND METHOD FOR MERGING VERTICAL BLANKING INTERVALS

(75) Inventor: Anthony Cucinotta, Flower Mound, TX (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/787,601

(22) PCT Filed: Sep. 21, 1999

(86) PCT No.: PCT/US99/21874

§ 371 (c)(1),
(2), (4) Date: Jul. 2, 2001

(87) PCT Pub. No.: WO00/18118

PCT Pub. Date: Mar. 30, 2000

(51) Int. Cl.
*H04N 7/00* (2006.01)

(52) U.S. Cl. .................. 348/473; 348/476; 348/714; 348/716

(58) Field of Classification Search ............. 348/473, 348/476–479, 553, 558, 714–715; *H04N 7/00*
See application file for complete search history.

(56) References Cited

U.S. PATENT DOCUMENTS

| 4,578,812 | A | * | 3/1986 | Yui | 382/300 |
| 4,730,212 | A | * | 3/1988 | Wojcik et al. | 348/61 |
| 5,517,588 | A | * | 5/1996 | Kondo | 382/300 |
| 6,262,775 | B1 | * | 7/2001 | Kim | 348/465 |
| 6,462,986 | B1 | * | 10/2002 | Khan | 365/185.2 |

FOREIGN PATENT DOCUMENTS

| EP | 0018783 | 11/1980 |
| GB | 2286321 | 8/1995 |

* cited by examiner

*Primary Examiner*—Trang U. Tran
(74) *Attorney, Agent, or Firm*—Benjamin D. Driscoll

(57) ABSTRACT

This invention teaches an apparatus and method for merging information transmitted in vertical blanking interval (VBIs) of several services into a single VBI. The system includes a pair of memories for each service wherein each memory is toggled between a read and write cycle. While the first memory is in a write cycle, the second memory is in a read cycle and vice versa. A field programmable gate array (FPGA) controls the first and second pairs of memory to merge the VBIs.

16 Claims, 2 Drawing Sheets

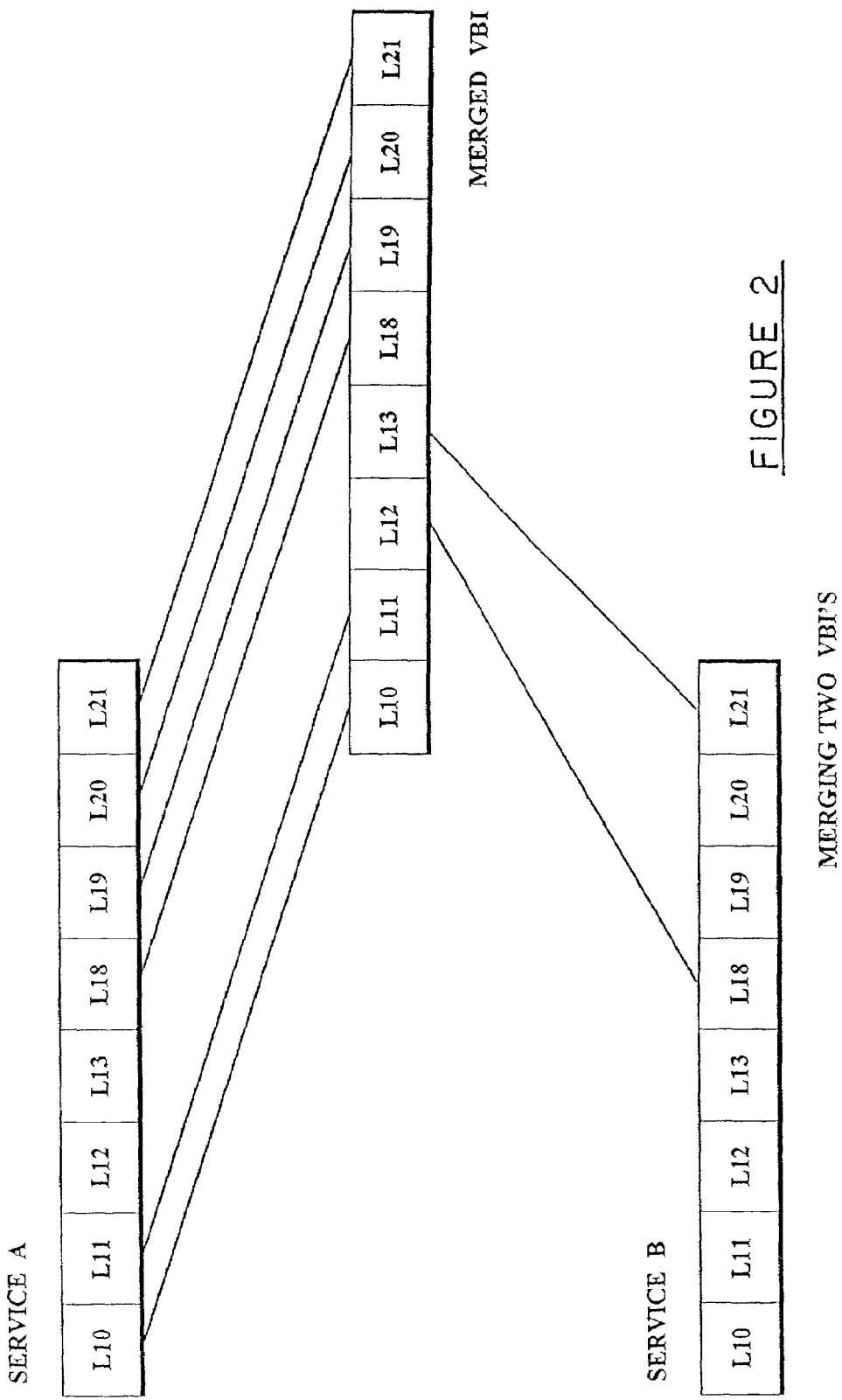

APPARATUS AND METHOD FOR MERGING VERTICAL BLANKING INTERVALS

BACKGROUND

This invention is related to cable television (CATV) and wireless transmission systems. More particularly, the invention is related to an apparatus for merging selected lines of at least two vertical blanking intervals (VBIs) for transmission over the RF band which is typically reserved for a single VBI.

With the increasing array of services from CATV and wireless network operators, it has become imperative for operators to offer more services in the same amount of RF transmission bandwidth. Moreover, wireless pay television systems, whether MMDS or conventional VHF/UHF television, are generally constrained to far fewer channels than the conventional CATV systems with which they compete. The challenge is offering more channels to subscribers within the spectrum constraints imposed by government regulations.

For a typical television program, since the video portion of the program occupies most of the available 6 MHz on an NTSC television channel, much of the research toward maximizing the amount of bandwidth has been traditionally devoted towards compressing and minimizing the amount of bandwidth the video information occupies. Accordingly there exists a need for providing more channel capacity within the same amount of transmission bandwidth while maintaining the quality of the transmitted data.

Ancillary information services are typically transmitted using existing television broadcast channels. The ancillary information is transmitted in the VBI and decoded at a television in order to display the ancillary information along with the television picture. Ancillary information typically includes text, for example closed captioning or related program information. Since the ancillary information transmitted along the VBI does not typically utilize the entire bandwidth assigned to the VBI, it is desirable to merge several VBIs into the bandwidth allotted for a single VBI in order to minimize the overall bandwidth required for the television transmission.

United Kingdom Patent Application No. GB 2286321A discloses a method for data distribution comprising storing packets of data in a random access memory, storing transmission characteristics for each packet, reading the characteristics and transmitting each packet to an audience in accordance with the frequency and timing parameters set forth in the packets' particular transmission characteristics. However, this system does not have the capability of merging the information from several VBIs into the bandwidth allotted for a single VBI.

SUMMARY

It is therefore an object of the invention to provide a method and apparatus for merging VBIs into the bandwidth allotted for a single VBI.

This and other objects have been achieved by providing a method and an apparatus for merging VBIs. The VBIs are merged by sequentially writing selected VBIs of a field to a first memory, then writing selected VBIs of a second field to a second memory while reading VBIs from the first memory in a desired sequence.

BRIEF DESCRIPTION OF THE DRAWINGS

FIG. 2 is a diagram VBIs from two services merged into a single VBI.

DETAILED DESCRIPTION OF THE PREFERRED EMBODIMENT

Figure 1:
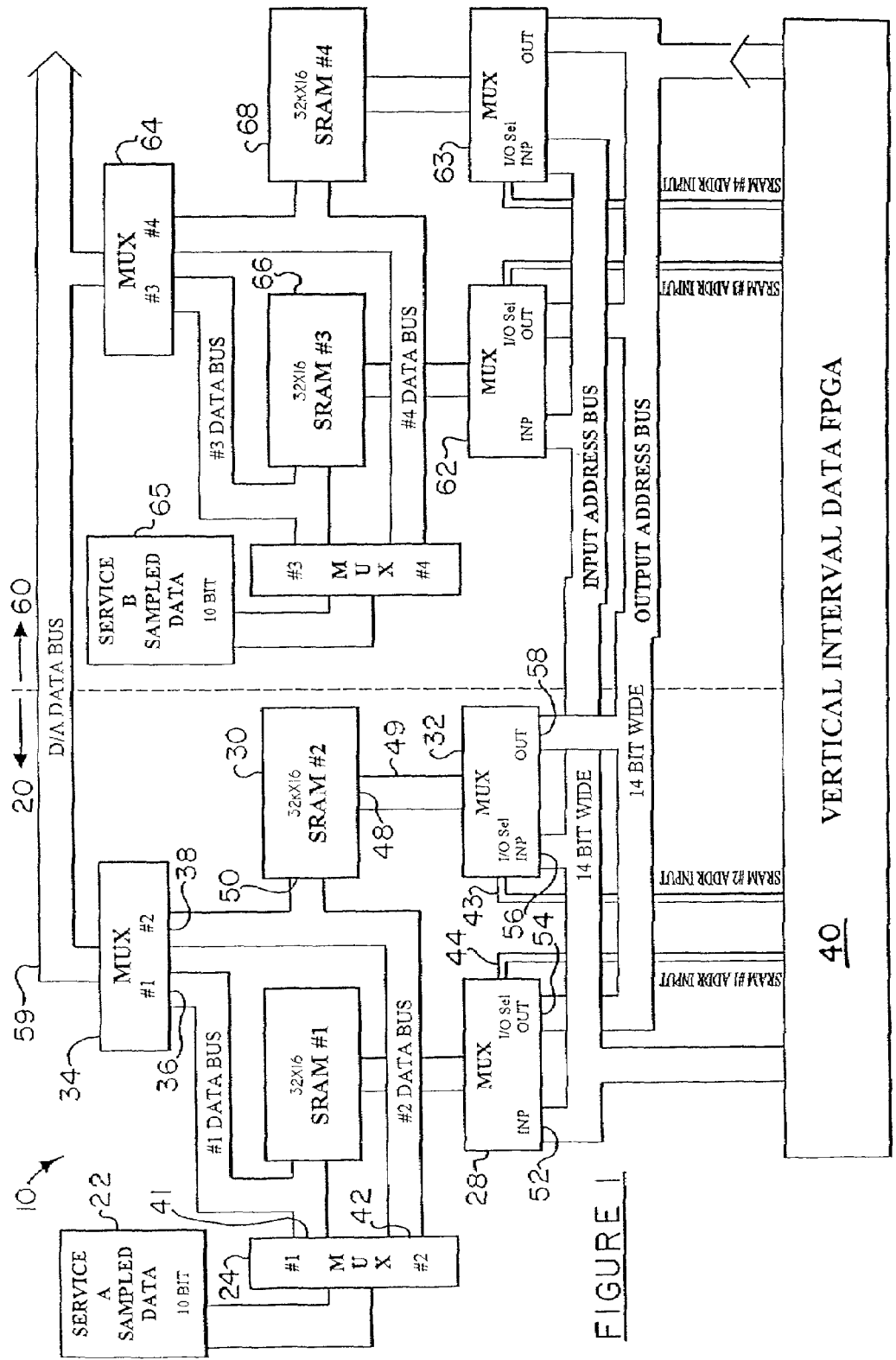
FIG. 1 is a diagram of the merging system according to the present invention.

The invention will now be described in greater detail with reference to the drawings, wherein like numerals represent like elements throughout. The system 10 shown in FIG. 1 for merging VBIs is divided into two symmetric halves 20, 60. The first half 20 is connected to a first service which will be referred to as service A while the second half 60 is connected to a second service which will be referred to as service B. A field programmable gate array (FPGA) 40 is connected to a microprocessor (not shown) and controls both halves 20, 60. The preferred FPGA 40 for this system is a QuickLogic QL3025-2 PQ208C. It should be understood however that other commercially available field programmable gate arrays or other control circuits having similar functionality may be utilized as a substitute for this component. The FPGA 40 is preferably controlled by a microprocessor on a Zilog Z8S180 circuit card. It should also be understood that other commercially available microprocessors serving similar FPGA control functions may be utilized as a substitute for this component.

The FPGA 40 is connected to an input multiplexer 24 which receives input data from service A at port 22. The input multiplexer 24 has a first output 41 connected to number 1 data bus and a second output 42 connected to number 2 data bus. Both number 1 data bus and number 2 data bus are bidirectional to allow data flow in both directions. Memory 26 is connected to number 1 data bus at 46 and is controlled by the FPGA 40. It should be understood that while the memories 26 and 30 are shown as static RAM, other suitable memory devices may be utilized for this application. An address bus 45 extends from the memory 26 to a first control multiplexer 28. The first control multiplexer 28 has a first input 52 connected to the FPGA 40 and an output port 54 also connected to the FPGA 40. Input 52 is connected to a corresponding input on control multiplexers 62, 63 in the second half 60. Likewise, output port 54 is also connected to corresponding outputs on control multiplexers 62, 63 in the second half 60. A directional signal from the FPGA 40 is connected to the control multiplexer 28 at I/O select port 44. Likewise, a second directional signal from the FPGA 40 is connected to the control multiplexer 32 at I/O select port 43.

The number 1 data bus also extends to an output multiplexer 34 at port 36. The output multiplexer is connected to the number 2 data bus at port 38. A second memory 30 is connected to the number 2 data bus at port 50 and to an address bus 49 at port 48. The address bus 49 extends to a second control multiplexer 32 having an I/O select port 56 being connected to the input 52 of the first control multiplexer 28. An output port 58 is connected to the output port 54 of the first control multiplexer 28. Both ports 56 and 58 are also connected to the FPGA 40 and to corresponding control multiplexers 62, 63 in the second half 60. An output data bus 59 extends from the output multiplexer 34 and is coupled to a complimentary output multiplexer 64 of the second half 60.

Operation of the system 10 will be described in greater detail with reference to FIGS. 1 and 2. Turning first to FIG. 2, it should be understood that a pair of services each containing a series of VBI information stored along selected lines of a picture field are to be merged into a single VBI. For example, FIG. 2 shows a sample merged VBI. It can be seen that selected lines from service A and selected lines from service B are assembled into selected locations in the merged VBI. It should also be understood that, while only part of the lines displayed for service A and part of the lines for service B have been selected for the merged VBI, the merged VBI could be sized accordingly to receive all the selected lines of service A and all the selected lines of service B as long as the merged VBI does not exceed a maximum size limitation of a given television picture field. Assume, for example, that the desired information to be transmitted from service A appears on lines 10-21 of service A. Assume also, that the desired VBI information of service B appears at lines 10-21. The merged VBI can contain some of the lines from each service as shown in FIG. 2 or it may contain all of the lines 10-21 from each service. This control is achieved by programming the FPGA 40 using a microprocessor (not shown). Those reasonably skilled in the art would appreciate that while lines 10-21 have been selected in these services for transmitting data along the VBI, other lines could be selected for transmitting the same data.

Referring back to FIG. 1, service A is sampled at a desirable sample rate, for example this system utilizes 909 samples per video line, however it should be understood that other sample rates may be selected based upon design requirements or preferences. Service A sample data 22 is fed into the input multiplexer 24. The FPGA 40 controls the input multiplexer 22 to send the sample data either to port 41 along number 1 data bus or port 42 along number 2 data bus. The FPGA 40 controls each memory 26, 30 so that, while memory 26 is receiving data from the input multiplexer 22 along number 1 data bus (write cycle), memory 30 is being read from port 50 along the number 2 data bus (read cycle) and vice versa. Therefore, VBI lines corresponding to a given field and sampled at a rate of 909 samples per line are written into memory 26 while a series of lines from the previous field having been stored in a similar fashion are being read from the memory 30.

Each of the memories 26, 30 are controlled through a respective control multiplexer 28, 32. The FPGA 40 sends input addresses along the input address bus through input 52 and address bus 45 to the memory 26 to indicate where each consecutive sample for the series of VBI lines is to be stored. These addresses are preferably sequential addresses, however it should be understood that the FPGA 40 may be programmed to control the memory 26 so that samples are stored in a non-sequential manner. Data is read from the memory 26 in the following cycle along number 1 data bus. Data is read from the memory 26 according to addresses sent by the FPGA 40 along the output address bus to output port 54. The data is read out of the memory in a non-sequential order as directed by addresses sent from the FPGA 40 through output port 54 of the control multiplexer 28. For example, as shown in FIG. 2, data written in from line 18 of service B could be read out at line 12 in the merged VBI. The FPGA 40 could optionally be programmed to send addresses to the memory 26 such that data is read out sequentially. The data in the form of sampled VBIs is read along number 1 data bus into port 36 of the output multiplexer 34 and on to the output data bus 59. It should be understood that during a first cycle, the number 2 data bus has data flowing from the input multiplexer 24 into the memory 30 and there is no data flowing into port 38 of the output multiplexer 34. During the next cycle, data is read from the memory 30. The output data bus therefore receives non-sequential VBI line data corresponding to a first field from memory 26 and then receives non-sequential VBI data from a second field from memory 30. It should be understood however that the FPGA 40 could be programmed to read data out in any order including a sequential order. This process is duplicated for service B in system half 60. The processes are synchronized so that when memory 26 is in a read cycle, memory 66 is also in a read cycle. Accordingly, when memory 30 is in a read cycle, memory 68 is also in a read cycle. The same applies to memories 26 and 66. Write cycles are similarly synchronized. The output data bus 59 therefore receives some line samples from output multiplexer 34 and some line samples from output multiplexer 64 to create the merged VBI shown in FIG. 2. The FPGA 40 controls the selection of lines from each service. Therefore, for each line of the merged VBI, (FIG. 1) the FPGA 40 selects the service and line number from data previously stored in the memories.

An advantage of this invention is that several services VBIs may be transmitted in a single VBI thus reducing the bandwidth necessary for transmission.

It will be understood by those reasonably skilled in the art that minor variations of the embodiment presented here are intended to be within the scope of the invention. For example, where reference is made to sampling or digitizing data, it should be appreciated that similar analog methods could be substituted. Other such minor variations are intended to be within the scope of the invention which is intended to be limited only by the appended claims.

What is claimed is:

1. A method for merging vertical blanking intervals comprising:
   storing a plurality of lines of data from a first service in a first memory (26) during a first write cycle;
   storing a plurality of lines of data from a second service in a third memory (66) during the first write cycle;
   storing a second plurality of lines of data from the first service in a second memory (30) during a second write cycle;
   storing a second plurality of lines of data from the second service in a fourth memory (68) during the second write cycle;
   reading selected lines of data in the second and fourth memories (30), (68) during the first write cycle; and
   reading selected lines of the data in the first and third memories (26), 66) during the second write cycle.

2. The method of claim 1 wherein the memories (26), (30), (66), (68) are controlled by a controller (40).

3. The method of claim 2 wherein the controller (40) sends memory addresses to the memories (26), (30), (66), (68) during the write cycles to direct the data into selected memory locations.

4. The method of claim 3 wherein data is selected and read from locations in each memory (26), (30), (66), (68) according to addresses sent from the controller (40).

5. An apparatus for merging video data comprising:
   a controller (40);
   first (26), second (30), third (66), and fourth (68) memories, responsive to said controller (40);
   an input address bus (45), (49) connected between the controller (40) and the memories (26), (30), (66), (68);
   an output address bus connected between the controller (40) and the memories (26), (30), (66), (68);
   a first service input (22) connected to the first (26) and second (30) memories;
   a second service input (65) connected to the third (66) and fourth (68) memories;
   an output bus (59) connected to the first (26), second (30), third (66), and fourth (63) memories;
   wherein the controller (40) stores data in the first (26) and third (66) memories while selectively reading data from the second (30) and fourth (68) memories during a first cycle and stores data in the second (30) and fourth (68)

memories while selectively reading data from the first (26) and third (66) memories during a second cycle.

6. The apparatus according to claim 5 further comprising a plurality of control multiplexers (28), (32), (62), (63) operatively connected to the controller (40), each for controlling a respective one of the memories (26), (30), (66), (68).

7. The apparatus according to claim 5 wherein the controller (40) comprises a field programmable gate array.

8. The apparatus according to claim 5 further comprising an output data bus (59) connected to each of the memories (26), (30), (66), (68).

9. The apparatus according to claim 8 further comprising a first output multiplexer (34) operatively connected between the first (26) and second (30) memories.

10. The apparatus according to claim 9 further comprising a second output multiplexer (64) operatively connected to the first output multiplexer (34) and between the third (66) and fourth (68) memories.

11. The apparatus according to claim 8 further comprising a first input multiplexer (24) for directing data into the first (26) and second (30) memories.

12. The apparatus according to claim 11 further comprising a second input multiplexer for directing data into the third (66) and fourth (68) memories.

13. The apparatus according to claim 5 further comprising a plurality of control multiplexers (28), (32), (62), (63) operatively connected to each other and each being connected to a respective one of the memories (26), (30), (66), (68).

14. The apparatus according to claim 13 wherein said plurality of control multiplexers (28), (32), (62), (63) controls data flow in to and out of its respective memory (26), (30), (66), (68).

15. The apparatus according to claim 14 wherein said first output multiplexer (34) directs data out of the first (26) and second (30) memories to a common data bus (59).

16. The apparatus according to claim 15 wherein said second output multiplexer (64) directs data out of the third (66) and fourth (68) memories to the common data bus (59).

* * * * *